Dec. 13, 1932.  A. KRIEG  1,890,465
DRIVE MEANS FOR CORN HARVESTERS
Filed July 11, 1928    3 Sheets-Sheet 3

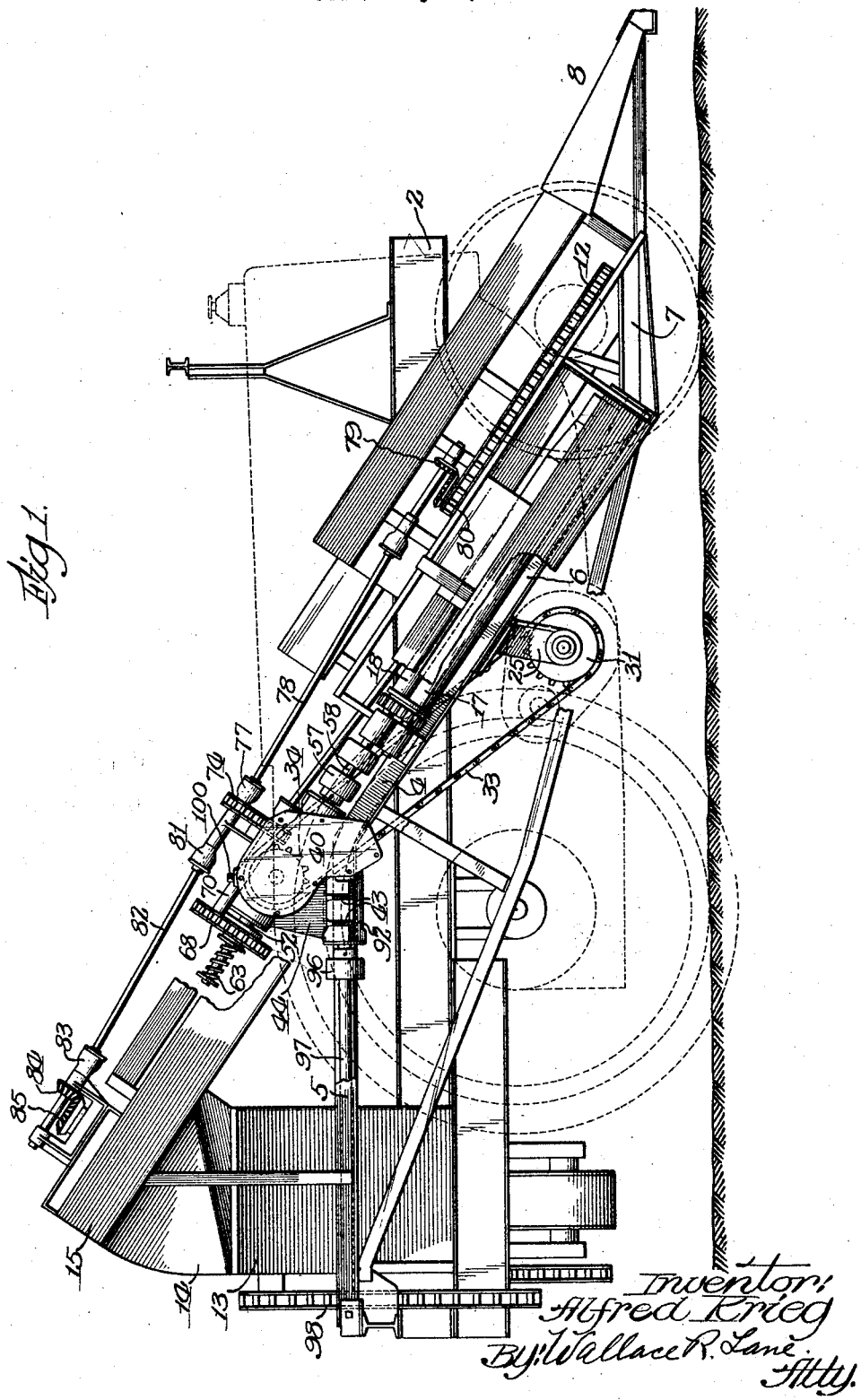

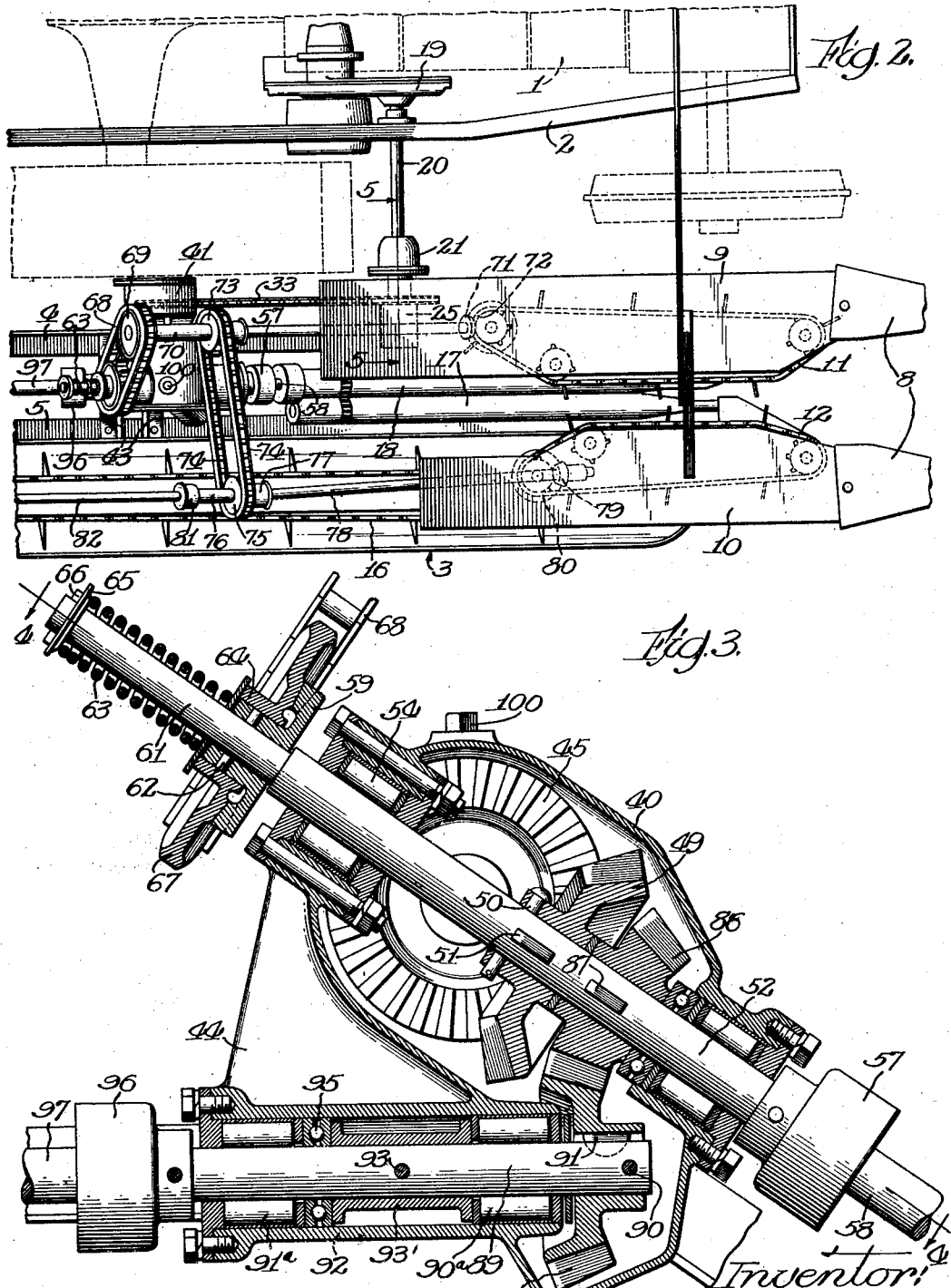

Inventor:
Alfred Krieg
By: Wallace R. Lane. Atty.

Patented Dec. 13, 1932

1,890,465

UNITED STATES PATENT OFFICE

ALFRED KRIEG, OF RACINE, WISCONSIN, ASSIGNOR, BY MESNE ASSIGNMENTS, TO OLIVER FARM EQUIPMENT COMPANY, OF WILMINGTON, DELAWARE, A CORPORATION OF DELAWARE

DRIVE MEANS FOR CORN HARVESTERS

Application filed July 11, 1928. Serial No. 291,714.

The present invention relates to drive means for corn harvesters, and other like and similar agricultural devices.

Among the objects of the invention is to provide a novel drive means or mechanism for corn harvester and the like; a drive device that will be smooth in running, self contained, simple in construction, capable of delivering power directly, efficiently and economically, rigid and strong in construction, vibrationless, economical in cost and operation, requiring little or no care, conveniently located for access, as for oiling, readily assembled as a unit, and subject to little or no wear.

Another object of the invention is to centralize the power transmitting elements, from which may extend the transmission lines to the various parts or mechanisms on the harvester, and to the power source. This is preferably accomplished by arranging a group or cluster of transmitting elements together, as in a housing rigid with a given part of the frame of the harvester, such as the chassis members thereof, and locating the same at a point or locus where distribution of power may be readily effected in the various directions above stated. By having a housing, which is preferably a single integral piece or unit, all the transmitting members may be protected and oiled, by running in a common oil or grease mass. Moreover, it is preferable to construct the housing with bearings, such as roller bearings, for the proper operative supporting of the line elements, such as the shafts connected to the operated means and from a part of the power transmitting means, all the bearings being thus grouped together or centralized for the benefits and advantages above mentioned.

Other objects, advantages, capabilities and features are comprehended by the invention as will later appear and are inherently possessed thereby.

Referring to the drawings:

Fig. 1 is a view in side elevation of a corn harvester using the present invention.

Fig. 2 is a top plan view thereof.

Fig. 3 is a sectional view taken in a plane vertically through a part of the novel driving mechanism.

Figure 4:
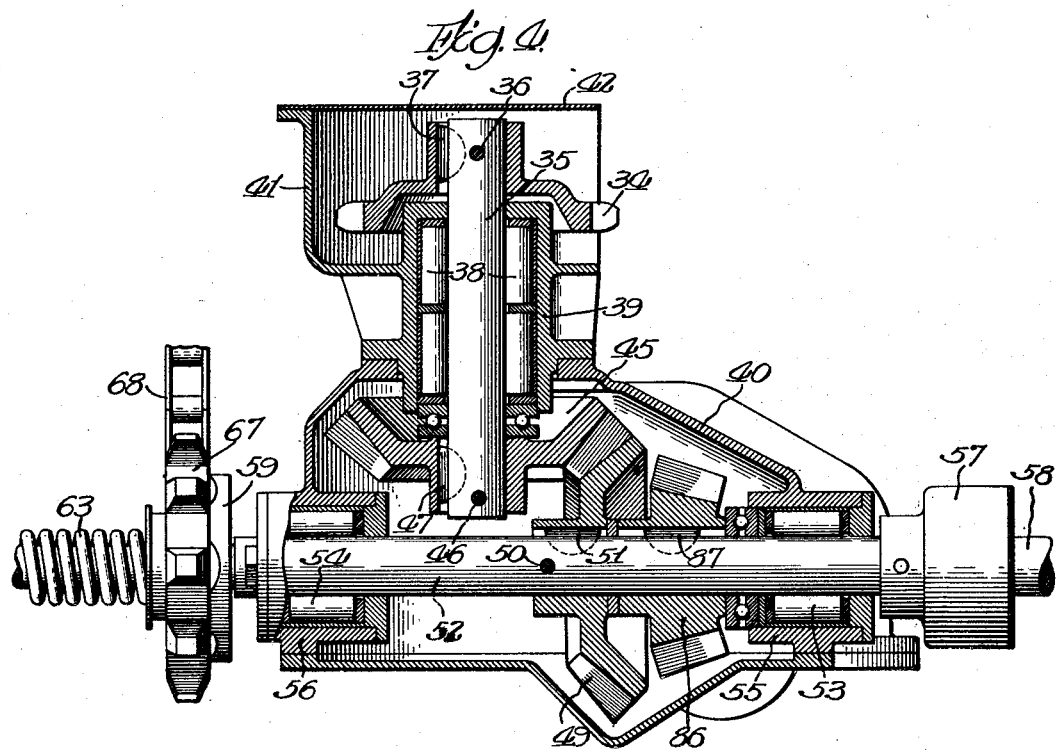
Fig. 4 is a sectional view taken in a plane represented by line 4—4 in Fig. 3 of the drawings.

Referring more in detail to the drawings, the embodiment of the invention selected to illustrate it, is shown in connection with a tractor operated corn harvester comprising a tractor 1 having fastened thereto a frame 2 connected at its rear end to the frame of the corn harvester generally designated by the reference character 3 in Fig. 2 of the drawings. The corn harvester has a frame or chassis comprising a pair of angle members 4 and 5 extending forwardly and downwardly forming inclined portions 6 and a forward portion 7, connected at its forward end with suitable shoes 8. Extending rearwardly from the shoes may be provided suitable cover devices 9 and 10 adapted for housing gathering chains 11 and 12, the operation of which is well known in the art. At the rear end of the harvester is provided a suitable husking device 13 adapted to receive gathered ears of corn by way of the chute 14, connected to a conveyer mechanism 15 having a conveying chain or the like 16. In the throat of the harvester is provided a pair of snapping rolls 17 and 18.

The power mechanism operating the various parts of the harvester, such as the gathering chains, the snapping rolls, husking device and conveyer, receives its power from a power take-off device carried by the tractor. The power take-off device is to the side of the tractor and has a suitable gear casing 19 from which proceeds a driving shaft 20, operating a universal joint or coupling 21, connected to a shaft 22 (see Fig. 5), operatively supported in roller bearings 23 in a journal box 24 rigidly secured by way of fixture 25 to a frame part 6 of the harvester, as by means of rivets, bolts or the like 27, all as clearly shown in Fig. 5. To the shaft 22 is secured a hub plate 28 by means of a cross pin 29, and to the rim 30 of the plate is secured a sprocket wheel 31, by means of bolts 32, all as clearly shown in Fig. 5 of the drawings. Over the sprocket wheel 31 operates a chain 33 leading to a sprocket wheel 34, secured to a shaft 35 by way of a cross pin 36 and a key 37, the shaft 35 being rotatably supported in roller bearings 38 having a journal box 39, either rigid with or an integral part of a gear housing 40, as clearly shown in Figs. 3 and 4 of the drawings. The journal box 39 preferably has a guard 41 provided with a cover 42 for housing the sprocket wheel 34.

Upon the chassis members 4 and 5 of the harvester, is rigidly secured a saddle or support 43, to which is either rigidly connected or integrally formed a pedestal 44 forming an integral part of the housing 40. It will be noted that this support is located at a convenient location for ready access and facile assembly of the parts.

Figure 5:
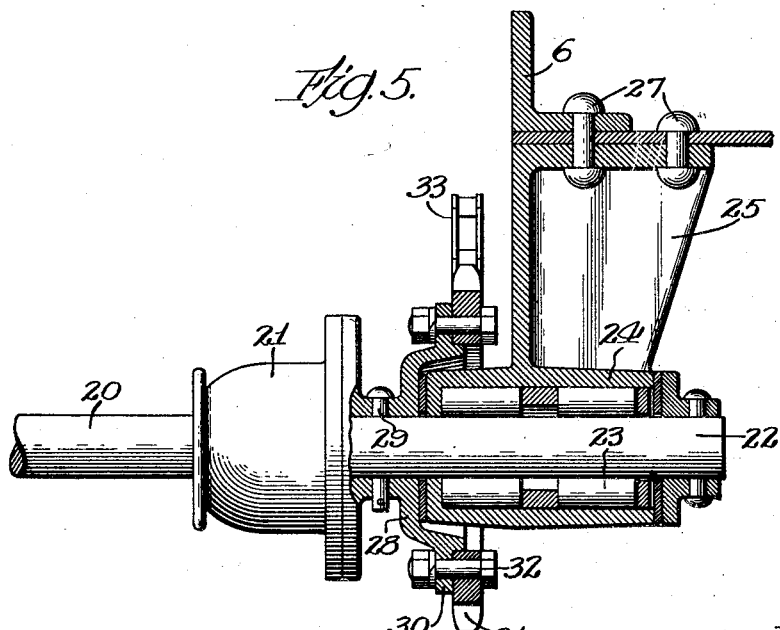
Fig. 5 is a view partly in section and partly in elevation taken in a plane represented by line 5—5 in Fig. 2 of the drawings.

The shaft 35 extends into the housing 40 and on its end is secured a gear 45 by means of a cross pin 46 and a key 47, the hub of the gear having an end thrust against a ball bearing 48, as clearly shown in Fig. 4 of the drawings. With the gear 45 is meshed a gear 49 secured by a cross pin 50 and a key 51 to a shaft 52, the latter extending through the housing 40 and having roller bearings 53 and 54 carried in journal boxes 55 and 56 formed integral with the housing 40. The shaft 52 extends forwardly of the housing and is connected by way of a coupling 57 to a shaft 58 leading to and in operative connection with one of the snapping rolls, such as roll 18, the latter being geared in suitable manner to the roll 17. This constitutes one of the drive lines to the snapping rolls.

The other end of the shaft 52 extends rearwardly and upwardly through the bearing 56 and carries a slip clutch member 59 cooperating with a slip clutch member 60, the member 59 being secured to the projecting end portion 61 of the shaft by way of a cross pin 62. The clutch members are maintained normally in driving engagement by a spring 63 reacting between the hub 64 on the member 60 and a collar or washer 65 abutting a cross pin or nut 66 secured to the outer end portion of the shaft 61. The clutch member 60 has sprocket teeth 67 with which operates a chain 68 operating over a sprocket wheel 69 secured to the end of a shaft 70 extending forwardly to drive the gathering chain 11, the shaft 70 operating such chain by way of gears 71 and 72 in a manner known in this art. Upon the shaft 70 is also secured a sprocket wheel 73 operating through a chain 74 operating over a sprocket wheel 75 secured to a shaft 76. The latter is connected by way of a joint 77 to a shaft 78 leading to gears 79 and 80 for operating the gathering chain 12 in a manner known in the art. The shaft 76 is connected at its rear, through a joint 81 to a shaft 82 leading to a second joint 83 and operating through gears 84 and 85 connected to suitable mechanism for operating the conveyer chain 16. The conveyer chain 16 is adapted for conveying the ears of corn to the upper part of the machine for feeding the same by way of the chute 14 into the husker 13.

Upon the shaft 52 is also secured a gear 86 by means of a key 87. This gear 86 is in mesh with a gear 88 secured to the end of a shaft 89 by means of a cross pin 90 and a key 91. The shaft 89 is rotatably supported in roller bearings 90$^a$ and 91$^a$ supported in a journal box 92 forming an integral part of the housing 40, and is located at the lower portion thereof. For the purpose of taking up thrust of the shaft 89, the same has secured to it a thrust sleeve 93' secured by a cross pin 93 and having an end in thrust engagement with ball bearings 95, as clearly shown in Fig. 3 of the drawings. The shaft 89 extends beyond the box 92 and is connected by way of a universal joint 96 to a shaft 97 leading to the rear of the machine and connected through suitable operating mechanism 98 for operating the husker or husking mechanism of the harvesting device. The housing has, in the upper wall thereof, an oil filling opening normally closed by cup 100 as clearly shown in Fig. 2 of the drawings.

From the above, it will be apparent that the drives to and from the gears in the housing extends to and from a common distributing locus or centralized driving and power transmitting means. The gears are housed in the housing 40 where they may run in oil, and the bearings are grouped together in the same locus so as to make the device more efficient in its operation. This simplifies the construction over those heretofore used, and makes for an easier assembly as well as affording more facile access and providing for more direct drives to the various parts of the harvesting machine.

While I have herein described and upon the drawings shown an illustrative embodiment of the invention, it is to be understood that it is not limited to the same, but may comprehend other constructions, arrangements of parts, details and features without departing from the spirit thereof.

Having thus disclosed the invention, I claim:

1. In a tractor operated harvesting mechanism, a frame therefor and comprising a pair of spaced frame members, a saddle rigidly connected to said frame members, a housing rigid with said saddle, roller bearings carried by said housing, a centralized group of power transmitting elements operatively supported in said bearings, a power take-off extending laterally from the tractor and operative connections extending from said group to operative devices on said harvesting mechanism and to said power take-off means.

2. In a tractor operated harvesting device, a frame therefor, a centralized group of power transmitting members, means rigid with said frame for operatively supporting said members, a power operating line connected to a member and extending laterally from the group and to a power take-off means on a tractor, a second line connected to another member and extending forwardly for operating snapping rolls, a third line connected to said other member and extending rearwardly for operating a husker and conveyer on the device.

3. In a tractor operated harvesting device, a frame therefor, a centralized group of power transmitting members, means rigid with said frame for operatively supporting said members, a power operating line connected to a member and extending laterally from the group and to a power take-off means on a tractor, a second line connected to another member and extending forwardly for operating snapping rolls, a third line connected to said other member and extending rearwardly for operating a husker and conveyer on the device, and a fourth line connected to the second line and extending rearwardly for operating gathering means on the device.

In witness whereof, I hereunto subscribe my name to this specification.

ALFRED KRIEG.